United States Patent [19]

Nishimatsu et al.

[11] Patent Number: 4,592,942
[45] Date of Patent: Jun. 3, 1986

[54] MAGNETIC RECORDING MEDIUM

[75] Inventors: Masaharu Nishimatsu, Komoro; Toshiaki Ide; Hiroyuki Arioka, both of Saku; Yuichi Kubota, Komoro, all of Japan

[73] Assignee: TDK Corporation, Tokyo, Japan

[21] Appl. No.: 652,575

[22] Filed: Sep. 20, 1984

[30] Foreign Application Priority Data

Sep. 20, 1983 [JP] Japan .................. 58-172208

[51] Int. Cl.$^4$ .............................................. G11B 5/72
[52] U.S. Cl. .................... 428/148; 360/134; 360/135; 360/136; 427/128; 427/131; 427/132; 428/141; 428/323; 428/328; 428/329; 428/408; 428/694; 428/695; 428/900
[58] Field of Search .............. 428/694, 900, 695, 403, 428/405, 407, 328, 329, 408, 323, 141, 148; 427/132, 131, 128; 360/134–136

[56] References Cited

U.S. PATENT DOCUMENTS

| | | |
|---|---|---|
| 3,993,824 | 11/1976 | Shirahata .................. 428/900 |
| 4,267,206 | 5/1981 | Johnson .................... 428/900 |
| 4,275,113 | 6/1981 | Saito ....................... 427/131 |
| 4,328,935 | 5/1982 | Steel ....................... 428/694 |
| 4,367,261 | 1/1983 | Miyoshi .................... 428/900 |
| 4,439,486 | 3/1984 | Yamada ..................... 428/695 |
| 4,443,514 | 4/1984 | Yamamoto ................... 427/131 |
| 4,452,863 | 6/1984 | Takizawa ................... 428/423.1 |
| 4,455,345 | 6/1984 | Miyatuka ................... 428/695 |
| 4,547,419 | 10/1985 | Nishimatsu ................. 428/694 |

Primary Examiner—Ellis P. Robinson
Attorney, Agent, or Firm—Oblon, Fisher, Spivak, McClelland & Maier

[57] ABSTRACT

A magnetic recording medium comprising a non-magnetic substrate, a magnetic recording layer formed on one side of the substrate and a back coating layer on the other side of the substrate, characterized in that the back coating layer is a coating composed essentially of carbon black, a resin binder and a lubricant, the weight ratio of the carbon black to the binder being from 1:1 to 1:4, and the carbon black having a particle size of from 10 to less than 100 m$\mu$m.

5 Claims, 2 Drawing Figures

MAGNETIC RECORDING MEDIUM

The present invention relates to a magnetic recording medium having excellent electromagnetic conversion characteristics, running durability and a good winding appearance with strong adhesion and minimum abrasion of the back coating layer and which is free from deposition of inorganic fillers, particularly carbon black, during the process for its preparation. More particularly, the present invention relates to a magnetic recording medium having a feature in the composition of the coating layer (i.e. the back coating layer) formed on the side of the substrate opposite to the side on which a magnetic recording layer is provided.

Recently, magnetic recording media have been widely used in the fields of audio and video recording, computers, magnetic discs, etc. Accordingly, the amount of information to be recorded on magnetic recording media increases year after year, and there is an increasing demand for the improvement of the recording density of magnetic recording media.

As a one of the conditions required for a magnetic recording medium for high density recording, it has been suggested to improve the coercive force and to make the medium thinner both from the theoretical and experimental points of view. There have been various proposals with respect to the compositions of the binder (a binding agent), inorganic filler or lubricant for the back coating layer (e.g. Japanese Examined Patent Publication No. 29769/1982). However, there have been various problems with respect to the running durability (the winding outer appearance or abrasion of the back coating layer), the adhesion of the back coating layer or calender stains during the process for the preparation (dropouts caused by the abrasion of the back coating layer or the calendar stains). Further, none of the them is fully satisfactory with respect to the electromagnetic conversion characteristics.

The present inventors have conducted extensive researches on the composition of the back coating layer with an aim to solve the above-mentioned difficulties, and have found that it is possible to obtain a remarkably improved magnetic recoridng medium having excellent running durability and adhesion and being free from calender stains during the process for the preparation by specifying, in the composition of the back coating layer, the inorganic filler, particularly the ratio of the carbon black to the binder and the particle size of the carbon black and by using a lubricant, particularly a fatty acid or a fatty acid ester. Thus, the present invention provides a magnetic recording medium comprising a non-magnetic substrate, a magnetic recording layer formed on one side of the substrate and a back coating layer on the other side of the substrate, characterized in that the back coating layer is a coating composed essentially of carbon black, a resin binder and a lubricant, the weight ratio of the carbon black to the binder being from 1:1 to 1:4, and the carbon black having a particle size of from 10 to less than 100 m$\frac{3}{4}$m.

Now, the present invention will be described in detail with reference to the preferred embodiments.

In the accompanying drawings.

Figure 1:
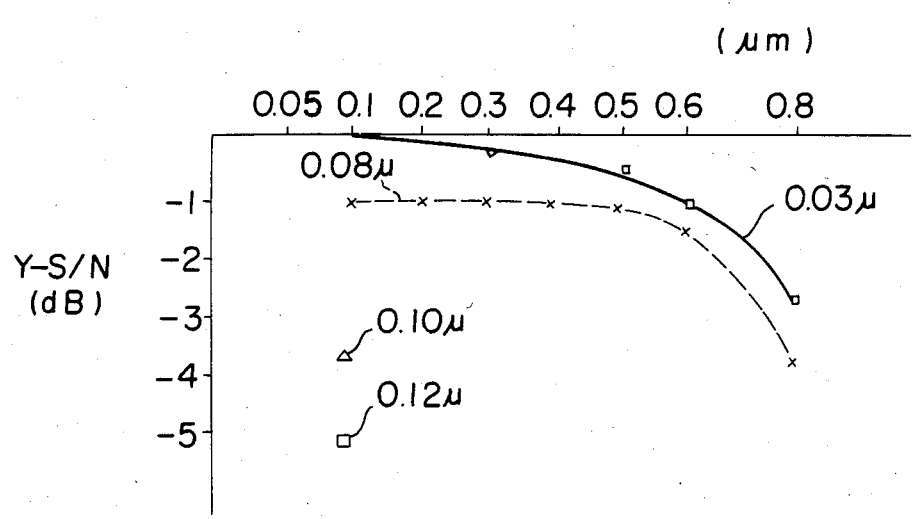
FIG. 1 is a graph illustrating the relation between the surface roughness of the magnetic layer and the back coating layer of a magnetic recording medium and the S/N ratio.

As the carbon black to be used for the back coating layer of the present invention, there may be employed any carbon black produced by any one of conventional methods, such as furnace, channel, acetylene, thermal or lamp. However, acetylene black, furnace black, channel black, roller and disc black and German naphthalene black are preferred. The particle size of the carbon black to be used in the present invention is from 10 to less than 100 m$\mu$m, preferably from 20 to 80 m$\mu$m, as measured by an electron microscopic photography. If the particle size is 100 m$\mu$m or greater, the antistatic effect of the back coating layer tends to be poor, the roughness of the back coating layer surface tends to be great and thus is likely to roughen the magnetic layer when the magnetic recording medium is wound up as a magnetic tape, or the electromagnetic conversion characterisics tend to be inferior. The Young's modulus of elasticity of the back coating layer is adequately high when the particle size is less than 100 m$\mu$m. However, when the particle size exceeds 100 m$\mu$m, the Young's modulus of elasticity tends to decrease, and the adhesion of the back coating layer tends to decrease as well. On the other hand, if the particle size is less than 10 m$\mu$m, the dispersion of the particles in the coating material for the back coating layer tends to be non-uniform, whereby a uniform dispersion is not obtainable, thus leading to a decrease of the Young's modulus of elasticity. Further, because of the non-uniformity, it is impossible to adequately reduce the electrostatic property of the back coating layer.

If a lubricant is not incorporated, the back coating layer will have a high frictional coefficient, whereby flickering of the image or jitters are likely to be brought about. Further, since the frictional coefficient is especialy high under a high temperature running condition, abrasion of the back coating is likely to be led, and the tape winding tends to be irregular.

As the resin binder to be used as the back coating layer of the present invention, there may be employed thermoplastic resins, thermosetting resins or reactive resins, or a mixture thereof, which are commonly used for the magnetic recording media. However, from the viewpoint of the strength of the formed coating layer, a thermosetting type resin is preferred.

As the thermoplastic resins, there may be employed those having a softening point of at most 150° C., an average molecular weight of from 10,000 to 200,000 and a degree of polymerization of from about 200 to 2,000. For instance, there may be mentioned a vinyl chloride-vinyl acetate copolymer (including the one containing a carboxylic acid), a vinyl chloride-vinyl acetate-vinyl alcohol copolymer (including the one containing a carboxylic acid), a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, a urethane elastomer, a nylon-silicone resin, a nitrocellulose-polyamide resin, a polyvinyl fluoride, a vinylidene chloride-acrylonitrile copolymer, a butadiene-acrylonitrile copolymer, a polyamide resin, a polyvinylbutyral, a cellulose derivative (such as cellulose acetate, cellulose diaceate, cellulose triacetate, cellulose propionate or nitrocellulose), a styrene-butadiene copolymer, a polyester resin, a chlorovinyl ether-acrylate copolymer, an amino resin, a synthetic rubber-type thermoplastic resin, or a mixture thereof.

As the thermosetting resins or reactive resins, there may be employed those which have a molecular weight of at most 200,000 in the state of the coating solutions and which undergo, when heated after being applied and dried, a condensation or addition reaction to have an unlimited molecular weight. Among these resins, those which do not soften or melt until the thermal decomposition, are preferred. Specifically, there may be mentioned, for instance, a phenol resin, an epoxy resin, a polyurethane thermosetting resin, a urea resin, a melamine resin, an alkyd resin, a silicone resin, an acrylic reactive resin, an epoxy-polyamide resin, a nitrocellulose melamine resin, a mixture of a high molecular weight polyester resin with an isocyanate prepolymer, a mixture of methacrylate copolymer with a diisocyanate prepolymer, a mixture of a polyester polyol with a polyisocyanate, a urea formaldehyde resin, a mixture of a low molecular weight glycol/a high molecular weight diol/triphenylmethane triisocyanate, a polyamine resin or a mixture thereof.

Particularly preferred is a thermosetting resin which is a combination of nitrocellulose (cellulose resin), a vinyl chloride-vinyl acetate-vinyl alcohol copolymer and urethane (wherein a curing agent is used), or a radiation curable resin which is composed of a vinyl chloride-vinyl acetate-vinyl alcohol copolymer or an acryl-modified vinyl chloride-vinyl acetate-vinyl alcohol copolymer and a urethane acrylate. As the radiation curable resin, there may be employed, in addition to the above-mentioned preferred combination, a thermoplastic resin which contains in its molecule or is incorporated with radiation curable or polymerizable groups such as acrylic double bonds of acrylic acid, methacrylic acid or their ester compounds containing unsaturated double bonds having radical polymerizability, allyl-type double bonds of e.g. diallylphthalate, or unsaturated bonds of e.g. maleic acid or a maleic acid derivative. As other useful binder components, there may be mentioned acrylic acid, methacrylic acid and acrylamide as monomers. A binder containing double bonds may also be obtained by modifying various polyesters, polyols, polyurethanes or the like with a compound having an acrylic double bond. Further, it is also possible to obtain resins having various molecular weights by incorporating a polyhydric alcohol and a polybasic carboxylic acid, as the case requires. The above-mentioned specific examples are only a part of useful radiation sensitive resins, and they may be used in combination as a mixture. It is preferred to use a radiation curable resin, since the curing time is short and there will be no transfer of e.g. fillers from the back coating surface to the magnetic layer after the winding up operation. Whereas, in the case of thermosetting resin, there will be a problem that the electromagnetic conversion characteristics differ as between the inner side and the outer side of the jumbo roll during the course of the thermosetting due to the transfer of the rear side pattern of the back coating surface caused by the tightening of the winding of the jumbo roll at the time of the thermosetting.

The curing agent to be used in the present invention may be any curing agent which is commonly used for thermosetting resins of this type. Particularly preferred is an isocyanate-type curing agent. For instance, there may be mentioned Kryspon 4565 and 4560 manufactured by Dai-Nippon Ink & Chemicals Co., Colonate L manufactured by Nippon Polyurethane Industry Co. and Takenate XL-1007 manufactured by Takeda Chemical Industries, Ltd.

As the lubricant for the back coating layer of the present invention, there may be employed any conventional lubricant which is commonly used for back coating layers of this type. However, it is particularly preferred to employ a fatty acid and/or a fatty acid ester.

As the fatty acid, there may be mentioned a fatty acid having at least 12 carbon atoms (RCOOH where R is an alkyl group having at least 11 carbon atoms) such as caprylic acid, capric acid, lauric acid, myristic acid, palmitic acid, stearic acid, behenic acid, oleic acid, elaidic acid, linolic acid, linolenic acid or stearolic acid. As the fatty acid ester, there may be employed a fatty acid ester of a monobasic fatty acid having from 12 to 16 carbon atoms with a monohydric alcohol having from 3 to 12 carbon atoms or a fatty acid ester of a monobasic fatty acid having at least 17 carbon atoms with a monobasic alcohol having carbon atoms in a total of from 21 to 23 as added with the number of carbon atoms of the fatty acid.

The thickness of the back coating layer of the present invention is usually within a range of from 0.3 to 10 $\mu$m after being coated and dried.

With respect to the amounts of the additives to be used in the present invention, from 15 to 50 parts by weight of the curing agent and from 1 to 8 parts by weight of lubricant are used relative to 100 parts by weight of the binder.

As mentioned above, in the present invention, the weight ratio of the carbon black to the binder is from 1:1 to 1:4. If the ratio is outside this range, the Young's module of elasticity of the back coating layer decreases substantially. If the proportion of the binder is less than this range, the coating layer tends to be brittle, the adhesion of the back coating layer lowers, and carbon black tends to fall off, whereby the deposition of carbon takes place during the calender treatment, and dropouts will increase. On the other hand, if the proportion of the binder exceeds the above-mentioned range, the coating layer tends to be brittle due to the decrease of the Young's modulus of elasticity, and the effectiveness of the carbon black as a filler tends to decrease, whereby the deposition is likely to take place during the calender treatment, and abrasion of the back coating is likely to be observed during the high temperature running. Within the above-mentioned range, a range of from 1:1.3 to 1:3 is particularly preferred.

According to the present invention, as a back coating layer, a cured coating layer is employed wherein the weight ratio of the filler, particularly carbon black, to the binder is selected to be within a specified range, the particle size of the carbon black is specified, and a fatty acid and/or a fatty acid ester is used as a lubricant, as mentioned above, whereby it is possible to obtain a magnetic recording medium which is superior in the running durability and the adhesion of the back coating layer, and which is free from the falling off of the back coating, whereby there will be no deposition of carbon black during the process for the preparation of the magnetic recording medium, especially in the process for calender treatment, and dropouts will be minimized. Further, with the particle size of carbon black being specified, the surface roughness of the back coating layer is good and, when cut into a tape, the tightening of the tape winding is reduced, whereby the transfer of the roughness of the back coating surface to the magnetic layer is minimized, accordingly the electromagnetic conversion characteristics will be improved, the adhesion to the magnetic layer and cinching phenomenon can be reduced, the S/N ratio can be maintained at a satisfactory level, and it is possible to obtain a magnetic recording medium having a tough back coating layer. The surface roughness of the back coating layer is preferably from 0.05 to 0.6 $\mu$m.

As the magnetic layer of the present invention, there may be employed a coating type composed of a coating layer comprising fine ferromagnetic particles and a binder, or a thin metal film type composed of a thin layer of ferromagnetic metal. As the ferromagnetic material, there may be mentioned $\gamma$-$Fe_2O_3$, $Fe_3O_4$, Co-doped $\gamma$-$Fe_2O_3$, Co-doped $\gamma$-$Fe_2O_3$-$Fe_3O_4$ solid solution, Co compound-adsorbed $\gamma$-$Fe_2O_3$, Co compound-adsorbed $Fe_3O_4$ (inclusive of an intermediately oxidized state with $\gamma$-$Fe_2O_3$ (the Co compound here is meant for e.g. cobalt oxide, cobalt hydroxide, cobalt ferrite or cobalt ion-adsorping substance, whereby the magnetic anisotropy of cobalt is utilized for the improvement of the coercive force), or iron, cobalt, nickel, other ferromagnetic metal or a magnetic alloy such as Fe-Co, Fe-Ni, Co-Ni, Fe-Rh, Fe-Cu, Fe-Au, Co-Cu, Co-Au, Co-Y, Co-La, Co-Pr, Co-Gd, Co-Sm, Co-Pt, Ni-Cu, Fe-Co-Nd, Mn-Bi, Mn-Sb or Mn-Al. Further, a ferrite magnetic substance such as Ba ferrite or Sr ferrite may be mentioned.

Heretofore, there have been commonly used as the ferromagnetic powder, for instance, $\gamma$-$Fe_2O_3$, Co-containing $\gamma$-$Fe_2O_3$, $Fe_3O_4$, Co-containing $Fe_3O_4$ or $CrO_2$. However, the magnetic characteristics such as the coercive force and the maximum residual magnetic flux density of these ferromagnetic powders, are inadequate for high sensitivity high density recording, and they are not suitable for use for magnetic recording of a signal having a short recording wavelength of a level of at most about 1 $\mu$m or for the magnetic recording with a narrow track width.

As the requirements for the magnetic recording media have become severe, there have been developments in or proposals for ferromagnetic powders having characteristics suitable for high density recording. Such ferromagnetic powders include metals or alloys such as Fe, Co, Fe-Co, Fe-Co-Ni or Co-Ni, and alloys thereof with Al, Cr or Si. For the purpose of high density recording, the magnetic recording layer using such an alloy powder is required to have a high coercive force and a high residual magnetic flux density. Therefore, it is desirable that various methods for the production or alloy compositions are selected to meet these requirements.

The present inventors have prepared magnetic recording media by employing various alloy powders, and have found that a magnetic recoridng medium with a noise level being sufficiently low and suitable for high density short wave recording is obtainable when the specific surface area as measured by BET method is at least 48 $m^2/g$, the coercive force of the magnetic layer is at least 1000 Oe, and the surface roughness of the magnetic layer is at most 0.08 $\mu$m as a $R_{20}$ value (an average value of 20 values) with a cut off of 0.17 mm by Talystep method. When such a magnetic layer is combined with the back coating layer of the present invention, the cinching phenomenon (the loosening of the tape winding when the tape has been stopped abruptly), dropouts and abrasion can be reduced. Further, there is a trend that as the base for the magnetic tape, a plastic film made of e.g. polyethylene terephthalate, polyethylene naphthalate, polyimide or polyamide has a thickness as thin as about 11 $\mu$m or less, and accordingly there is an increasing tendency for greater tightening of the tape winding, thus leading to the transfer of the surface roughness of the back coating surface to the magnetic layer and the consequential decrease in the output. Such drawbacks are also overcome by the above-mentioned combination of the magnetic recording layer and the back coating layer according to the present invention. Further, when a ferromagnetic metal is used as the major component of the ferromagnetic material, it is likely that the electric resistance of the layer is high, and dropouts are likely to result, and accordingly it is necessary to take a certain antistatic measure. However, such a problem can be solved also by the combination with the back coating layer of the present invention.

The preferred range of the coercive force of the above-mentioned magnetic recording layer is from 1,000 to 2,000 Oe. If the coercive force exceeds this range, the magnetic head tends to be saturated at the time of recording, or it becomes difficult to erase the magnetization. In general, the greater the specific surface area of the magnetic powder, the more the S/N ratio will be improved. However, if the specific surface area is too large, the dispersibility of the magnetic powder into the binder tends to be poor, or the effectiveness tends to be saturated. On the other hand, the surface roughness of the magnetic recording layer affects the recording sensitivity. If the surface roughness is small, the recording sensitivity for a short wavelength will increase.

As a ferromagnetic alloy satisfying the above characteristics, there may be employed a fine powder of Co, Fe-Co, Fe-Co-Ni or Co-Ni, or such a fine powder mixed with Cr, Al or Si. It may be a fine powder obtained by wet-reducing a metal salt with a reducing agent such as $BH_4$, a fine powder obtained by coating the surface of iron oxide with a Si compound and dry-reducing the product in $H_2$ gas, or a fine powder obtained by evaporating an alloy in a low pressure argon atmosphere, and it has an axial ratio of from 1:5 to 1:10 and a residual magnetic flux density Br of from 2,000 to 3,000 gauss, and satifies the above-mentioned conditions for the coercive force and the surface area.

Various binders may be employed in combination with the alloy magnetic powder to prepare magnetic coating compositions. It is usually preferred to employ a thermosetting resin binder or a radiation curable binder. As other additives, there may be employed a dispersant, a lubricant or an antistatic agent in accordance with the conventional method. Since there is a problem in the dispersibility because of the employment of the magnetic powder having a BET specific surface area of 48 $m^2/g$, it is advisable to employ a surfactant or an organic titanium coupling agent as the dispersant. As the binder, there may be employed a binder comprising a vinyl chloride-vinyl acetate-vinyl alcohol copolymer, a polyurethane prepolymer and a polyisocyanate, such a binder which further contains nitrocellulose, other known thermosetting binders, or a radiation curable binder containing resin groups such as acrylic double bonds or maleic double bonds sensitive to ionized energy.

In accordance with a usual method, the alloy magnetic powder is mixed with the binder and a predetermined solvent and various additives to prepare a magnetic coating material. The coating material is then coated on a substrate such as a polyester base film and then subjected to thermosetting or radiation curing to form a magnetic layer, and further subjected to calender treatment.

In a case where a radiation curable binder is used for both the magnetic layer and the back coating layer, a continuous curing is possible, and no transfer of the roughness of the rear side to the magnetic layer is likely to take place, whereby dropouts can be prevented. Besides, the radiation curing can be conducted on-line, thus serving for the energy saving and manpower saving for the production, which in turn results in the reduction of the costs. From the property point of view, it is possible not only to prevent dropouts due to the tightening of the winding during the heat curing operation but also to prevent the difference in the output in the longitudinal direction of the magnetic tape attributable to the difference in the pressure of the respective portions in the direction of radius of the rolled tape. When the base thickness is as thin as 11 μm or less and the surface hardness of the magnetic layer is small as the hardness of the metal magnetic powder is smaller than the magnetic oxide such as $\gamma\text{-}Fe_2O_3$, the magnetic recording medium is susceptible to the influence of the tightening of the tape winding. However, by means of the radiation-cured back coating layer, this adverse effect can be eliminated, and the output difference as between the outside and the inside of the wound tape, or the difference in the dropouts can be eliminated. Thus, it is particularly preferred to employ a radiation curable binder for the back coating layer.

In addition to the above combination, a combination of the back coating layer of the present invention with a thin ferromagnetic metal film as the magnetic recording layer provides excellent electromagnetic conversion characteristics and good surface roughness and serves to prevent curling and minimize the dropouts.

The magnetic recording medium of the present invention can be used in a wide range of various fields such as audio tapes, video tapes, computers and magnetic discs.

Now, the present invention will be described in further detail with reference to Examples. However, it should be understood that the present invention is by no means restricted by these specific Examples.

EXAMPLE 1

On one side of a polyethylene terephthalate base film having a thickness of 9 μm, a magnetic coating layer composed of cobalt-adsorbed acicular $\gamma\text{-}Fe_2O_3$ magnetic powder (long axis: 0.4 μm, short axis: 0.05 μm, Hc: 600 Oe) and a binder (a mixture of a vinyl chloride-vinyl acetate copolymer with a polyurethane elastomer plus a curing agent) and having a thickness of 3 μm, was formed under the usual conditions for the preparation of video tapes.

Then, a mixture having the following composition was dispersed in a ball mill for 5 hours.

| | | |
|---|---|---|
| Carbon black: | 25 mμm (furnace method) | various amounts |
| Curing agent: | Colonate L | 20 parts by weight |
| Lubricant: | Stearic acid | 4 parts by weight |
| | Butyl stearate | 2 parts by weight |
| Nitrocellulose: | | 40 parts by weight |
| Vinyl chloride-vinyl acetate-vinyl alcohol copolymer (S-lec A manufactured by Sekisui Plastics Co., Ltd.) | | 30 parts by weight |
| Polyurethane elastomer (Estan 5703 manufactured by Nippon Polyurethane Industry Co.) | | 30 parts by weight |
| Solvent mixture (MIBK/toluene) | | 250 parts by weight |

Carbon black was added in an amount of 20, 25, 33, 50, 80, 100 and 125 parts by weight relative to 100 parts by weight of the binder, and the samples thereby obtained were designated as Sample Nos. 1-1, 1-2, 1-3, 1-4, 1-5, 1-6 and 1-7, respectively, in this order.

These seven samples were applied, respectively, on the side of the substrate opposite to the side on which the magnetic recording layer was previously formed, to have a dry thickness of 1 μm, then dried, subjected to calender treatment for smoothing the surface and subjected to heating treatment at a temperature of 60° C. for 24 hours for curing.

Various characteristics of these samples were measured, and the results are shown in Table 1.

TABLE 1

| Samples | 1-1 | 1-2 | 1-3 | 1-4 | 1-5 | 1-6 | 1-7 |
|---|---|---|---|---|---|---|---|
| Composition | | | | | | | |
| Carbon black | 20 | 25 | 33 | 50 | 80 | 100 | 125 |
| Binder | 100 | 100 | 100 | 100 | 100 | 100 | 100 |
| Running durability | | | | | | | |
| Winding appearance | X | Δ | ○ | ○ | ○ | Δ | X |
| Abrasion of the back coating surface | X | ○ | ○ | ○ | ○ | ○ | X |
| Adhesion to the guide poles during the running test | X | Δ | ○ | ○ | ○ | Δ | X |
| Adhesion of the back coating layer (g) | no peeling | no peeling | no peeling | no peeling | no peeling | 200 | 150 |
| Calender stains during the production | X | Δ | ○ | ○ | ○ | Δ | X |
| Young's modulus of elasticity of the back coating layer (Kg/mm$^2$) | 100 | 300 | 480 | 500 | 480 | 310 | 150 |
| Dropouts (number/min.) | | | | | | | |
| Initial | 200 | 50 | 25 | 10 | 15 | 45 | 100 |
| After the test | 1000 | 100 | 35 | 20 | 25 | 100 | 250 |

Running durability was measured by permitting the samples to run 100 times (100 runs) at 40° C. under a relative humidity of 60%.

It is evident from Table 1 that when the ratio of the carbon black to the binder is within a range of from 1:1 to 1:4, (1) the running durability is good, no abrasion of the back coating surface is observed, and the winding appearance is good, (2) the adhesion strength of the back coating layer is great, and no peeling of the back coating layer is observed even when FF (First Forward), RW (Rewinding) and Stop were repeated, (3) no deposition of carbon black during the calender treatment in the process for the preparation of the magnetic tape is observed, and dropouts are minimum, and (4) the Young's modulus of elasticity of the back coating layer is high, and the layer is tough. The above effectivensss is particularly remarkable when the ratio of the carbon black to the binder is within a range of from 1:1.3 to 1:3.

EXAMPLE 2

Mangetic layers 1 and 2 composed of ferromagnetic alloy powders and radiation curable back coating layer 2 were formed as follows:

Formation of magnetic layers

Various alloy powders were prepared by a wet-reduction method. These powders were composed of acicular particles having an axial ratio (short axis/long axis) of from 1/5 to 1/10 and had a residual magnetic flux density of from 2,000 to 3,000 gauss, a coercive force of from 1,000 to 2,000 Oe and a specific surface area of from 45 to 70 m$^2$/g as measured by BET method. These magnetic powders were mixed in a usual manner to have the following composition.

Magnetic layer 1

|  | Parts by weight |
|---|---|
| Fe—Co—Ni alloy powder<br>(Hc = 1200 Oe, long axis: 0.4 μm, short axis: 0.05 μm, BET: 52 m$^2$/g) | 100 |
| Vinyl chloride-vinyl acetate-vinyl alcohol copolymer (VAGH manufactured by UCC, U.S.A) | 15 |
| Polyurethane prepolymer<br>(Nipporan 4040 manufactured by Nippon Polyurethane Industry Co.) | 10 |
| Methyl ethyl ketone/toluene (1/1) | 250 |
| Myristic acid | 2 |
| Sorbitan stearate | 2 |

To this mixture, 30 parts by weight of polyisocyanate (Desmodule L manufactured by Bayer AG) was added to obtain a magnetic coating composition. The magnetic coating composition was applied onto a polyester film in a thickness of 2.5 μm and then subjected to calender treatment.

Magnetic layer 2

In the same manner as in the preparation of magnetic layer 1, a magnetic layer was formed by using the following composition.

|  | Parts by weight |
|---|---|
| Fe—Co—Ni alloy powder (BET: 60 m$^2$/g) | 100 |
| Saturated polyester resin | 5 |
| Acryl-introduced vinyl chloride-vinyl alcohol copolymer (degree of polymerization: 300) | 10 |
| Acrylic double bond-introduced polyether urethane elastomer | 10 |
| Solvent mixture<br>(same as in magnetic layer 1) | 250 |

Back coating layer 2

|  | Parts by weight |
|---|---|
| Carbon black: 25 mμm (Furnace method) | various amounts |
| Acryl-modified vinyl chloride-vinyl acetate-vinyl alcohol copolymer | 30 |
| Acryl-modified polyurethane elastomer | 30 |
| Lubricant: stearic acid | 4 |
| Solvent mixture (MIBK/toluene = 1/1) | 250 |

The above mixture was mixed in a ball mill for 5 hours, and then applied to the rear side of the polyester film on which the magnetic layer was previously formed, so that the dry thickness would be 1.5 μm. Then, electron beams were irradiated onto the back coating layer by means of an electron curtain type electron accelerator at a acceleration voltage of 150 KeV, an electrode current of 10 mA, and at an absorption dose of 5 Mrad in a nitrogen gas atmosphere to cure the back coating layer. Then, the coated film was calendered, wound up and cut into a video-tape with a width of ½".

By controlling the calender treatment, the surface roughness of the magnetic layers was adjusted to be within a range of from 0.01 to 0.08 μm, and likewise the surface roughness of the back coating layer was adjusted to be within the range of from 0.05 to 0.8 μm.

The characteristics of the magnetic recording medium obtained by a combination of the magnetic layer 2 and the back coating layer 2, are shown in Table 2.

TABLE 2

| Samples | 2-1 | 2-2 | 2-3 | 2-4 | 2-5 | 2-6 | 2-7 |
|---|---|---|---|---|---|---|---|
| Composition | | | | | | | |
| Carbon black | 20 | 25 | 33 | 50 | 80 | 100 | 125 |
| Binder | 100 | 100 | 100 | 100 | 100 | 100 | 100 |
| Running durability | | | | | | | |
| Winding appearance | X | Δ | O | O | O | Δ | X |
| Abrasion of the back coating surface | X | Δ | O | O | O | Δ | X |
| Adhesion to the guide poles during the running test | X | Δ | O | O | O | O | X |
| Adhesion of the back coating layer (g) | no peeling | no peeling | no peeling | no peeling | no peeling | 190 | 120 |
| Calender stains during the production | X | Δ | O | O | O | Δ | X |
| Young's modulus of elasticity of the back coating layer (Kg/mm$^2$) | 110 | 300 | 490 | 510 | 490 | 300 | 180 |
| Dropouts (number/min.) | | | | | | | |
| Initial | 250 | 80 | 35 | 30 | 30 | 50 | 100 |
| After the test | 1500 | 250 | 70 | 60 | 60 | 200 | 2500 |

From Table 2, it is evident that desirable characteristics are obtainable when the ratio of carbon black to the binder is within the range of from 1:1 to 1:4, preferably from 1:1.3 to 1:3. However, when compared with the case of Table 1, wherein a metal oxide magnetic layer was employed, in the case of Table 2 wherein a magnetic layer of an alloy magnetic powder was employed, the ratio of the carbon black to the binder in the back coating layer influences the number of dropouts due to the deposition of carbon during the calender treatment.

Magnetic recording media were prepared by appropriate combination of the above mangetic layers 1 and 2 with the back coating layer in Example 1 (the ratio of the carbon black to the binder being 1:2, hereinafter referred to as back coating layer 1) and back coating layer 2 and by changing the order of the formation of the layers. Calender treatment was applied at the time of the formation of each layer. The characteristics of the recording media were measured, and the results are shown in Table 3. In the Table, (1) and (2) indicate the order of the formation of the magnetic layer and the back coating layer.

TABLE 3

| | Magnetic layer | Back coating layer | Abrasion of the back coating layer | Cinching | Abrasion of the magnetic layer | Initial drop-outs (number per min.) | Y-S/N (dB) Outside | Y-S/N (dB) Inside |
|---|---|---|---|---|---|---|---|---|
| A | (1) Magnetic layer 1 | (2) Back coating layer 1 | ◉ | ◉ | ◉ | 80 | +0.2 | −2.0 |
|   | (2) Magnetic layer 1 | (1) Back coating layer 1 | ◉ | ◉ | ◉ | 80 | +0.2 | −2.0 |
| B | (1) Magnetic layer 1 | (2) Back coating layer 2 | ◉ | ◉ | ◉ | 55 | +0.3 | −0.6 |
| C | (2) Magnetic layer 1 | (1) Back coating layer 2 | ◉ | ◉ | ◉ | 55 | +0.3 | −0.2 |
| D | (1) Magnetic layer 2 | (2) Back coating layer 2 | ◉ | ◉ | ◉ | 30 | +0.6 | +0.6 |
|   | (2) Magnetic layer 2 | (1) Back coating layer 2 | ◉ | ◉ | ◉ | 30 | +0.6 | +0.6 |

◉ indicates "excellent"

From Table 3, it is evident that in the case of the radiation curable type (B, C), no transfer of the roughness of the rear side to the magnetic layer takes place as contrast to the case of the thermosetting type (A), and accordingly dropouts have been reduced and the outputs have been increased. In the case where both the magnetic layer and the back coating layer are made of a radiation curable type (D), a superior result is obtainable. From the comparison of groups B and C, it is evident that in the case of C, a thin base is reinforced by the first formed back coating layer, whereby the Young's modulus of elasticity of the base is increased, and the adverse effect due to the tightening of the tape winding can better be prevented as compared with the case of B. Further, in the case of group D, the curing is conducted continuously during the running, whereby no adverse effect due to the tightening of the tape winding is brought about. Further, by the incorporation of a fatty acid (in some cases, a fatty acid ester), the abrasion of the back coating surface or the jitters which adversely affect the image quality are suppressed. For instance, the frictional coefficient of D is 0.15, whereby the running is smooth. In the case where the fatty acid was eliminated from D, the frictional coefficient increases to 0.22, and the abrasion of the back coating layer or jitters are likely to take place since the friction under a high temperature running condition is high. Further, running property tends to be impaired.

Then, the surface roughness of the video tapes obtained in Example 2 was studied. FIG. 1 shows the S/N ratios (relative values) in the case where the video tapes were driven at a speed of 3.8 m/sec., and the recording and reproduction were conducted with a major frequency of 4.5 MHz. The numerical values allotted to the curves indicate the surface roughness of the magnetic layer. As is evident from the Figure, the S/N ratio can be kept at a high level when the surface roughness of the magnetic layer is at most 0.08 μm, and the surface roughness of the back coating layer is at most 0.6 μm.

Figure 2:
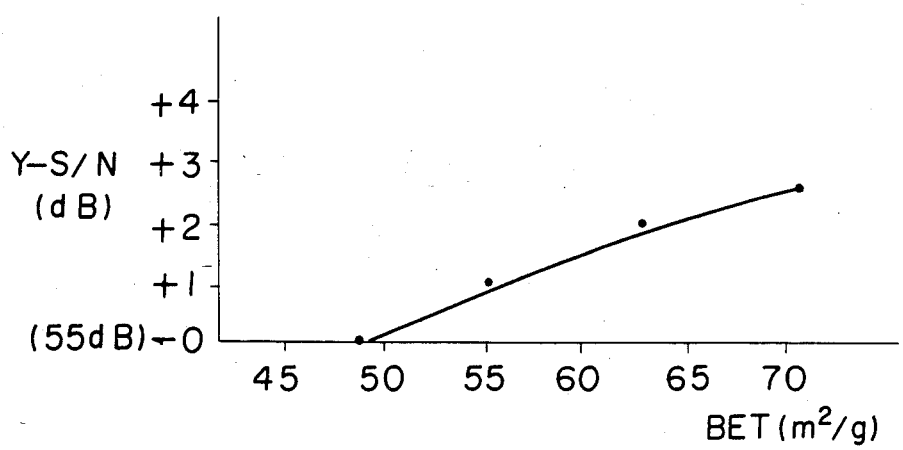
FIG. 2 is a graph illustrating the relation between the BET specific surface area of an alloy magnetic powder and the S/N ratio.

In Example 2, the relation between the BET specific surface area of the alloy powder and the S/N ratio was investigated with respect to the video tapes wherein the surface roughness of the magnetic layer was at most 0.08 μm and the surface roughness of the back coating layer was within a range of from 0.05 to 0.6 μm, whereby the results as shown in FIG. 2 were obtained. However, 55 dB was employed as the reference. From FIG. 2, it is apparent that excellent characteristics are obtainable when the BET value is at least 48 m$^2$/g.

Further, the tightening of the tape winding was measured, and at 40° C. under a relative humidity of 80%, satisfactory results were obtained in all cases.

EXAMPLE 3

On one side of a polyethylene terephthalate base film having a thickness of 10 μm, a Co-Ni alloy (Hc: 1100 Oe) was vapour-deposited by vacuum deposition in an average thickness of 0.2 μm to form a thin magnetic layer.

Then, a mixture having the following composition was dispersed in a ball mill for 5 hours.

| | |
|---|---|
| Carbon black: 80 mμm (furnace method) | various amounts |
| Acryl-modified vinyl chloride-vinyl acetate-vinyl alcohol copolymer (Prepared by the following method (a)) | 30 parts |
| Acryl-modified polyurethane elastomer (Prepared by the following method (b)) | 30 parts by weight |
| Lubricant: Stearic acid | 4 parts by weight |
| Butyl stearate | 2 parts by weight |
| Solvent mixture (MIBK/toluene) | 250 parts by weight |

The methods for the preparation of the radiation sensitive binders in the above mixture will be described as follows:

(a) Synthesis of an acryl-modified product of a vinyl chloride-vinyl acetate-vinyl alcohol copolymer 750 Parts by weight of S-lec A, 1250 parts by weight of toluene, and 500 parts by weight of cyclohexanone were charged into a four-necked flask of a 5-liter capacity and dissolved under heating. After raising the temperature to 80° C., 6.14 parts by weight of 2-hydroxyethyl methacrylate adduct of tolylene diisocyanate was added. Further, 0.012 part by weight of tin octylate and 0.012 part by weight of hydroquinone were added, and the reaction was carried out at a temperature of 80° C. in a nitrogen (N$_2$) stream until the conversion of NCO reached 90%. After completion of the reaction, the reaction system was cooled and diluted by addition of 1250 parts by weight of methyl ethyl ketone.

Production of 2-hydroxyethyl methacrylate (2HEMA) adduct of tolylene diisocyanate (TDI)

348 Parts by weight of tolylene diisocyanate was heated to a temperature of 80° C. in a four-necked flask of one-liter capacity in a nitrogen (N$_2$) stream. Thereafter, 260 parts by weight of 2-hydroxyethyl methacrylate, 0.07 part by weight of tin octylate, and 0.05 part by weight of hydroquinone were added dropwise into a reaction vessel, while cooling to control the temperature inside the reaction vessel to be in a range of from 80° to 85° C. After completion of the dropwise addition, the mixture was stirred for three hours at 80° C. to complete the reaction. After completion of the reaction, the reaction product was taken out of the reaction vessel and cooled to obtain 2-hydroxyethyl methacrylate (2HEMA) adduct of tolylene diisocyanate (TDI) as a white paste.

(b) Synthesis of an acryl-modified product of a urethane elastomer

250 Parts by weight of an isocyanate-terminated diphenylmethane diisocyanate (MDI) type urethane prepolymer, "Nipporan 4040", manufactured by Nippon Polyurethane Industry Co., 32.5 parts by weight of 2HEMA, 0.007 part by weight of hydroquinone, and 0.009 part by weight of tin octylate were charged into a reaction vessel, and dissolved under heating at 80° C. Then, 43.5 parts by weight of TDI was added dropwise into the reaction vessel, while cooling to control the temperature inside of the reaction vessel to be in a range of from 80° to 90° C. After completion of the dropwise addition, the reaction was conducted at 80° C. until the conversion of NCO reached at least 95

The carbon black was incorporated in an amount of 20, 25, 33, 50, 80 and 100 parts by weight relative to 100 parts by weight of the binder to obtain Sample Nos. 3-1, 3-2, 3-3, 3-4, 3-5, 3-6 and 3-7, respectively.

These 7 samples were applied, respectively to the side of the substrate opposite to the side on which the magnetic recording layer was previously formed, so that the dried thickness would be 1.5 μm, then dried and subjected to calender treatment for smoothing the surface. Then, electron beams were irradiated on the back coating layer by means of an electron cartain type electron beam accelerator at a acceleration voltage of 150 KeV, at an electrode current of 10 mA and at an absorption dosage of 3 Mrad in a nitrogen atmosphere to cure the back coating layer.

Vapour-deposited tapes are likely to be electrostatically charged, and it is especially effective to use carbon black in the back coating material, and it is possible to select very fine particles of pigment. Thus, the surface roughness of the back coating layer can be improved over other back coating materials. Further, with the application of the back coating, curling can be eliminated, and dropouts due to the electrostatic electricity can be suppressed.

Various characteristics of the magnetic tapes obtained from these samples were measured, and the results are shown in Table 4.

TABLE 4

| Samples | 3-1 | 3-2 | 3-3 | 3-4 | 3-5 | 3-6 | 3-7 |
|---|---|---|---|---|---|---|---|
| Composition | | | | | | | |
| Carbon black | 20 | 25 | 33 | 50 | 80 | 100 | 125 |
| Binder | 100 | 100 | 100 | 100 | 100 | 100 | 100 |
| Running durability | | | | | | | |
| Winding appearance | X | Δ | ○ | ○ | ○ | Δ | X |
| Abrasion of the back coating surface | X | ○ | ○ | ○ | ○ | ○ | X |
| Adhesion to the guide poles during the running test | X | Δ | ○ | ○ | ○ | Δ | X |
| Adhesion of the back coating layer (g) | no peeling | no peeling | no peeling | no peeling | no peeling | 190 | 120 |
| Calender stains | X | Δ | ○ | ○ | ○ | Δ | X |

TABLE 4-continued

| Samples | 3-1 | 3-2 | 3-3 | 3-4 | 3-5 | 3-6 | 3-7 |
|---|---|---|---|---|---|---|---|
| during the production | | | | | | | |
| Young's modulus of elasticity of the back coating layer (Kg/mm$^2$) | 120 | 300 | 500 | 510 | 500 | 290 | 180 |
| Curling | X | Δ | ○ | ○ | ○ | Δ | X |
| Dropouts (number/min.) | | | | | | | |
| Initial | 300 | 80 | 35 | 30 | 40 | 60 | 200 |
| After the test | 2500 | 250 | 70 | 50 | 65 | 250 | 2500 |

From Table 4, it is evident that when the ratio of the carbon black to the binder is within a range of from 1:1 to 1:4, (1) the running durability is good, and no abrasion of the back coating layer is observed, (2) the adhesion strength of the back coating layer is increased, and no falling of the back coating is observed even when FF, RW and Stop were repeated, and (3) the deposition of carbon black during the calender treatment in the process for the production of the magnetic tape can be eliminated, and the dropouts can be minimized. Further, the elasticity of the back coating layer is improved, whereby curling will be eliminated. The above effectiveness is particularly remarkable when the ratio of the carbon black to the binder is within the range of from 1:1.3 to 1:3.

EXAMPLE 4

Magnetic tapes were produced in the same manner as in Example 3 except that the particle size of carbon black was varied. The characteristics of the tapes were measured, and the results are shown in Table 5.

TABLE 5

| | Particle size mμm | | | | | |
|---|---|---|---|---|---|---|
| Test items | 100 | 80 | 30 | 25 | 20 | 10 |
| Roughness of the back coating layer (μm) | 0.35 | 0.22 | 0.12 | 0.12 | 0.12 | 0.28 |
| Electromagnetic conversion characteristics Y-C/N (dB) | 0 | +1.0 | +1.0 | +1.0 | +1.0 | +0.3 |
| Young's modulus of elasticity (kg/mm$^2$) | 450 | 510 | 510 | 500 | 450 | 300 |

From Table 5, it is evident that by adjusting the particle size of carbon black to less than 100 mμm, not only the roughness of the back coating layer surface is minimized, but also a remarkable effect for the improvements of the electromagnetic conversion characteristics i.e. the most important characteristics for the magnetic recording media, is obtainable.

The various characteristics were measured as follows:

1. Cinching phenomenon (winding appearance)

By means of a commercially available VHS system VTR, a tape was fast forwarded for the entire length and then fast rewound and stopped when the rest of the length was 50 m, and then fast rewound to the end of the tape. Then, the winding condition of the tape was visually observed. Good winding where no space was observed in the tape winding, was designated by ○ or ⊙ (excellent), and inferior winding where a space was observed in the tape winding, was designated by X.

2. Abrasion of the back coating layer

By means of a commercially available VHS system VTR, a tape was permitted to run 100 times at 40° C. under a relative humidity of 60%, whereupon the scratches on the back coating surface were observed. Symbol indicates that no stain was observed, and symbol X indicates that substantial stains were observed.

3. Adhesion to the guide poles during the running test

By means of a commercially available VHS system VTR, a tape was permitted to run 100 times at 40° C. under a relative humidity of 60%, whereupon the adhesion to the guide poles within the cassette case and to the guide poles in the VHS deck was observed.

4. Adhesion of the back coating layer

An adhesive double coated tape was bonded on a fixed board, and the back coating layer of a magnetic recording tape was adhered thereto. Then, the magnetic recording tape was pulled in a direction of 180° C., whereupon the tension for the peeling of the back coating layer was measured. The measurement was made at 20° C. by an autograph manufactured by Shimadzu Corporation.

5. Calender stain during the production

The calender deposition at the time of calender treatment at 70° C. during the process for the production, was observed.

6. Young's modulus of elasticity

The Young's modulus was measured at 20° C. by an elasticity spectro meter (Iwaki Seisakusho, Toyo Boardwin, Toyo Seikosha).

7. Dropouts

By using a VHS deck at 20° C. under a relative humidity of 60%, a single signal of 4 MHz was recorded and reproduced, whereby a number of samples wherein the reproduced signal lowers by at least 18 dB from the average reproduced level for at least 15 micro seconds, were counted with respect to 10 samples for 1 minute each, and the average number was taken as dropouts. The dropouts prior to the running test of the magnetic tape (initial) and the dropouts after 100 runs were measured.

8. Surface roughness

The surface roughness was obtained by 20 point average method from the chart obtained by means of Talystep (manufactured by TAYLOR-HOBSON CO.). A cut off of 0.17 mm and a needle-pressure of $0.1 \times 2.5\mu$ were employed.

9. Electromagnetic conversion characteristics

The S/N ratio (relative value) was shown as recorded and reproduced at a major frequency of 5 MHz. A VTR of VHS was modified so that it was capable of measuring up to 5 MHz.

10. Electron microscopic method (a) The average particle size was measured by a transmission electron microscope by selecting a sample from each tape.

(b) A cross sectional photographic method by means of a scanning type electron microscope. In this case, it happens that particles are coagulated, and if the irregularity of the particle size is great, the minimum particle size is taken as an average particle size.

11. Frictional coefficient

A magnetic tape was put around a polished aluminum cylinder having a diameter of 4 mm at an angle of 180° C. so that the back coating layer is located inside, and permitted to run at a speed of 2 cm/sec, whereby the tensions at the dispensing side and at the winding-up side were measured, and the frictional coefficient was obtained by calculation from the measured values.

We claim:

1. A magnetic recording medium comprising a non-magnetic substrate, a magnetic recording layer formed on one side of the substrate and a back coating layer on the other side of the substrate, characterized in that the back coating layer is a coating composed essentially of carbon black, a resin binder and a lubricant, the weight ratio of the carbon black to the binder being from 1:1 to 1:4, and the carbon black having a particle size of from 10 to less than 100 m$\mu$m.

2. The magnetic recording medium according to claim 1, wherein the magnetic recording layer is composed essentially of a ferromagnetic alloy powder dispersed in a resin binder and having a specific surface area of at least 48 m$^2$/g as measured by BET method, said magnetic recording layer having a coercive force of at least 1,000 Oe and a surface roughness of at most 0.08 $\mu$m.

3. The magnetic recording medium according to claim 1, wherein the magnetic recording layer is composed of a thin ferromagnetic layer.

4. The magnetic recording medium according to claim 1, wherein the carbon black has a particle size of from 20 to 80 m$\mu$m.

5. The magnetic recording medium according to claim 1, wherein the lubricant is a fatty acid, a fatty acid ester or a mixture thereof.

* * * * *